(12) United States Patent  (10) Patent No.: US 12,524,220 B2
Perez et al.  (45) Date of Patent: Jan. 13, 2026

(54) MAPPING CONFIGURATION DATA OF MICROSERVICES, APPLICATIONS, AND SERVICES

(71) Applicant: Hewlett Packard Enterprise Development LP, Spring, TX (US)

(72) Inventors: Ignacio Aldama Perez, Madrid (ES); Raul Rodriguez Aparicio, Madrid (ES); David Hermosilla Garzon, Madrid (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 205 days.

(21) Appl. No.: 18/161,208

(22) Filed: Jan. 30, 2023

(65) Prior Publication Data

US 2024/0256252 A1  Aug. 1, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................. G06F 8/65; G06F 8/71
See application file for complete search history.

(56) References Cited

U.S. PATENT DOCUMENTS 11,074,091 B1 * 7/2021 Nayakbomman ....... G06F 9/455
11,650,810 B1 * 5/2023 Wang ........................ G06F 8/73
  717/148

(Continued)

FOREIGN PATENT DOCUMENTS

CN  109245933 A  1/2019
CN  111597012 A  8/2020

(Continued)

OTHER PUBLICATIONS

Ferry, Kubernetes Application Containers: Managing Containers and Cluster Resources (Jul. 10, 2020) retrieved from https://developer.hpe.com/blog/kubernetes-application-containers-managing-containers-and-cluster-resour/ on Sep. 26, 2024 (Year: 2020).*

(Continued)

*Primary Examiner* — Lewis A Bullock, Jr.
*Assistant Examiner* — Theodore E Hebert
(74) *Attorney, Agent, or Firm* — Trop, Pruner & Hu, P.C.

(57) ABSTRACT

Examples described herein relate to mapping configuration objects of microservices in a cloud cluster. Examples include discovering isolated configuration objects of a microservice deployed in a cloud cluster, where relationships between the isolated configuration objects and a first package of the microservice is not visible. Examples include mapping the isolated configuration objects to a second package based on their metadata. After the mapping, the first and second packages are grouped into a configuration catalog, which includes complete configuration data of the microservice. Some examples include grouping configuration catalogs of multiple microservices into a library, which provides complete configuration data of an application composed of the multiple microservices. Some examples include grouping libraries of multiple applications into a parent library, which includes complete configuration data of a service composed of the multiple applications.

17 Claims, 5 Drawing Sheets

(56) References Cited

U.S. PATENT DOCUMENTS

| | | | | |
|---|---|---|---|---|
| 2018/0322558 A1* | 11/2018 | Padmanabh | ....... | G06Q 30/0603 |
| 2019/0042290 A1* | 2/2019 | Bailey | ................... | G06F 9/5077 |
| 2020/0106834 A1* | 4/2020 | Perez | ................. | H04L 67/1097 |
| 2020/0110638 A1* | 4/2020 | Asthana | ................. | H04L 67/51 |
| 2020/0133689 A1* | 4/2020 | Ferrell | ................. | H04L 41/044 |
| 2020/0403994 A1* | 12/2020 | Bitterfeld | ................ | H04L 67/53 |
| 2022/0029886 A1* | 1/2022 | Hameiri | ................ | H04L 67/133 |
| 2023/0168875 A1* | 6/2023 | Carter | ...................... | G06F 8/71 |
| | | | | 717/174 |

FOREIGN PATENT DOCUMENTS

| | | |
|---|---|---|
| CN | 114237651 A | 3/2022 |
| JP | 2022-536944 A | 8/2022 |

OTHER PUBLICATIONS

Hpe, " Application and service mapping for Kubernetes environments", V1.0, Aug. 2022, 6 pages.

* cited by examiner

MAPPING CONFIGURATION DATA OF MICROSERVICES, APPLICATIONS, AND SERVICES

BACKGROUND

Microservice architecture is an approach to develop applications as collections of smaller and specialized executable units called microservices. Organizations (e.g., datacenter customers or tenants) benefit from the microservice architecture as applications are simpler to build, maintain, and scale when used in conjunction with microservice orchestration tools (e.g., Kubernetes). Each microservice is developed as a separate container image along with configuration objects, each of which includes some configuration data of the microservice. In Kubernetes, microservice configuration is set up using configuration objects written as YAML files, (e.g. "service," "secret," "ConfigMap," "volume"). For example, the "service" object assigns an IP address to a pod of a container, the "secret" object stores confidential information (e.g., credentials and passwords) used by a pod, and so on. A Kubernetes controller uses such configuration objects to manage, deploy, and execute microservices in a Kubernetes cluster.

Typically, developers use a package manager (e.g., Helm) to install configuration objects of a microservice in a Kubernetes cluster. A package manager bundles configuration objects of a microservice in a package and, upon installation of the package, installs the configuration objects to node(s) of the cluster. Helm is a popular package manager that uses helm charts, which is a package of configuration objects or templates of the configuration objects of each microservice. Such package management technologies allow developers to change microservice configuration by injecting values into the templates without having to manually write and install each configuration object to the cluster.

Often, developers do not leverage such package managers due to a lack of expertise or knowledge to use them. It has become a common industry practice to create and deploy new configuration objects in clusters without bundling in or linking to a package despite the advantages of the package management technologies. As a result, some developers manually install configuration objects to the clusters. Such manual techniques also allow developers to install customized configuration objects, which may not be possible using package managers. Many large organizations also encourage developers to deploy configuration objects directly to a Kubernetes cluster (e.g., using kubectl commands).

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
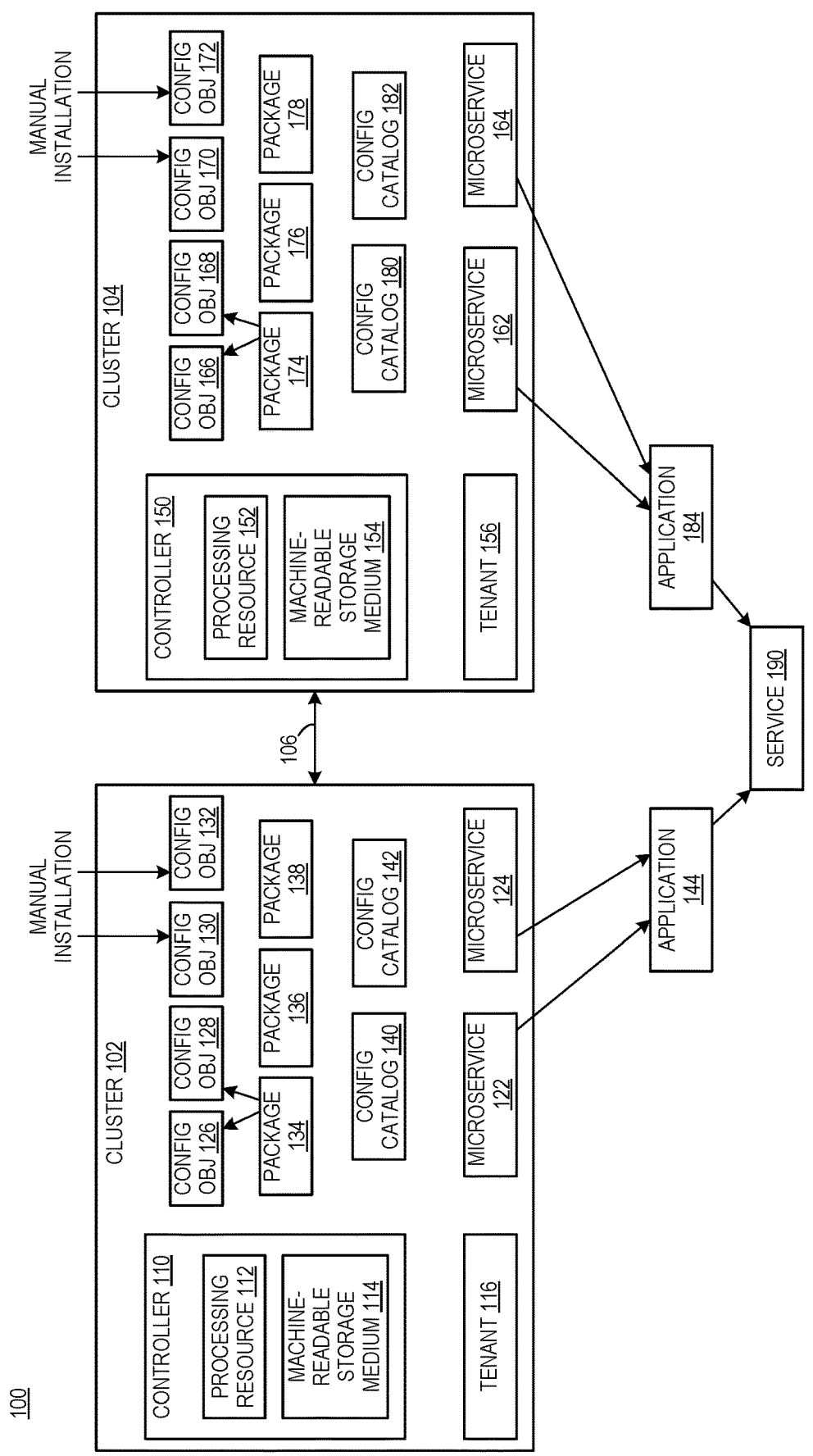
FIG. 1 is a block diagram depicting an example microservice orchestration system facilitating mapping of configuration data of microservices, applications, and services.

Certain examples have features that are in addition to or in lieu of the features illustrated in the above-referenced figures. Certain labels may be omitted from certain figures for the sake of clarity.

DETAILED DESCRIPTION

The absence of an industry accepted standard practice in creating and installing configuration objects to Kubernetes clusters introduces complexity for datacenter tenants when deploying, maintaining, and running applications as groups of microservices. For instance, to setup or modify microservice configuration, some tenants use package managers, while others manually install new configuration objects without installing a specific package. As a result, at any given instance, a Kubernetes cluster may include both packaged or non-isolated configuration objects (objects installed as part of a package installation) and isolated configuration objects (objects not installed as part of any package).

Due to the diversity and large number of configuration objects in a cluster, a tenant may not have visibility on the relationships between packages and configuration objects of a microservice. In particular, the tenant may not be able to ascertain the package from which a particular configuration object was installed simply by searching and inspecting the configuration objects in the cluster. The tenant cannot update or delete applications or microservices of the applications without the knowledge of all of their configuration objects. For example, if a tenant wants to update or delete a network function application, such as a virtualized router running on a cluster, then the tenant would have to identify the microservices of the virtualized router along with all of their configuration objects (packaged and isolated configuration objects) and then update or delete each microservice of the virtualized router. However, the tenant would find it cumbersome to keep track of the various configuration objects, packages, microservices of the application as the configuration objects and microservices may not only be in large numbers but also deployed across different clusters.

Some existing solutions include manually determining the relationships between configuration objects and packages in clusters. However, such solutions are tedious and demand expertise (e.g., knowledge of the particular package manager) and/or experience of the developer of the microservice and the configuration object. Manual determination can also be error-prone and inefficient. For instance, a tenant may inaccurately map configuration objects and packages in a cluster. In such instances, deleting a microservice may cause removal of configuration objects that are not related to the microservice. As a result, manual inspection of the configuration objects may become unmanageable and computing resources, time, and money may be lost to the mismanagement of isolated configuration objects. The lack of visibility of the configuration objects of microservices, applications (group of microservices), and services (group of applications) on the clusters may cause the clusters to operate inefficiently, impede scale in/scale out and/or healing operations.

In examples consistent with this disclosure, microservice orchestration systems discover and group configuration objects, packages, and microservices deployed in different datacenters according to their metadata to provide visibility on the relationships between each other. The relationships are defined in a single file (e.g., a catalog or a library), which provides a complete configuration data of microservices, applications, or services, to a tenant.

Examples described herein identify isolated configuration objects, which are directly and manually installed in a cluster, independent of a package installation. Examples create sub-groups of isolated configuration objects and assign each sub-group to a package based on labels specified in metadata of each object in the sub-group and the packages. For example, a sub-group is automatically added to a package when the sub-group and the package include identical labels. In some examples, a sub-group is added to a package when their labels are not identical but match with a label pair defined by the tenant. Examples also create a sub-group of isolated configuration objects that do not specify any labels and notify the tenant that the sub-group could not be added to any existing package in the cluster. The tenant may manually assign the sub-group to a package, or insert a label to the sub-group and examples may automatically assign the sub-group to a package specifying that label. Examples also allow the tenant to create a new package and assign the sub-group without the labels to the new package. By assigning isolated configuration objects to packages in this manner, examples ensure that configuration objects of microservices are organized and made accessible in the packages to the tenant.

After each isolated configuration object is organized into their respective packages in the clusters, examples described herein group the packages of a microservice within a configuration catalog for the microservice. A configuration catalog for a microservice includes comprehensive configuration data (i.e., all configuration objects) of the microservice. A tenant may read the configuration catalog and learn about the list of packages and the configuration objects within the packages of the microservice. When the tenant desires to update or delete the microservice, the tenant can use the configuration catalog to update or delete some or all of the configuration objects of the microservice.

Examples described herein may identify configuration catalogs of respective microservices that are deployed across multiple clusters. For example, a network function application, such as virtualized router, may include multiple microservices, each deployed in different datacenters. Examples may group the configuration catalog for each microservice of the virtualized router into a library. The library for an application includes comprehensive configuration data, i.e., all configuration objects and packages of the microservices of the application. A tenant may use the library to access packages and the configuration objects for each microservice of the application. When the tenant desires to update or delete a microservice or the application itself, the tenant can refer to the library to update or delete some or all of the configuration objects of the microservice or the application. Similarly, examples may also group the libraries of each application forming a service. For example, multiple applications (virtualized routers) may form a service (e.g., a virtual private network (VPN) service), and the libraries of respective virtualized router forming the VPN service may be grouped into a parent library for the VPN service. The parent library for a particular service includes comprehensive configuration data, i.e., all configuration objects, packages of the microservices of the applications, and libraries of the applications forming the service. A tenant may read the parent library for the service and learn about the list of configuration objects, packages, microservices, and applications for the particular service.

Examples of this disclosure improve microservice orchestration systems, and in particular, improve management of configuration data of microservices, applications, and services in large-scale datacenters at different locations. Examples provide visibility on configuration objects and their corresponding packages deployed across multiple datacenters with reduced manual intervention. Examples help tenants to avoid or reduce errors of manual mapping of configuration objects and achieve significant savings in time, money, computing and storage resources. Hence, examples provide technical improvements, which are primarily achieved in servers of the datacenters. Examples also allow customers to become aware of the relationships between configuration objects, packages, microservices, applications, and services, and confidently perform various management actions, such as deleting, updating, adding, or tracking the configuration objects of microservices executing at multiple clusters.

FIG. 1 depicts an example system 100 including an example microservice orchestration system facilitating mapping of configuration data of microservices, applications, and services.

Microservice orchestration system 100 includes cloud clusters 102 and 104 (e.g., Kubernetes clusters) connected over a network 106, such as a wide area network (WAN). The clusters 102 and 104 may be datacenters including several computing devices, such as servers (not shown in FIG. 1). The computing devices operate as controllers 110 and 150, which may implement a network functions virtualization orchestrator that virtualizes network functions, such as routing or switching, using applications. An application is a collection of microservices, each of which is a small executable unit (e.g., a container), performing a specialized function. The servers in the cluster 102 and 104 also host a microservice orchestrator (e.g., Kubernetes) to automate deployment, execution, and scaling of microservices.

Tenants 116 and 156 may access resources of the clusters 102 and 104, respectively. A tenant may be a user (e.g., a developer, an engineer, an administrator), or a group of users (e.g., an organization), who have rights and privileges to manage hardware resources (e.g., servers) and/or software resources (e.g., microservices) in the clusters 102 and 104. For example, the tenant 116 deploys microservices 122 and 124 and their configuration files in various servers of the cluster 102. The configuration files include configuration objects 126, 128, 130, and 132, each specifying configuration data of either the microservice 122 or the microservice 124. Similarly, in the cluster 104, tenant 156 deploys microservices 162 and 164 and their configuration objects 166, 168, 170, and 172, each specifying configuration data of either microservice 162 or microservice 164. Examples of configuration objects include, but not limited to, ConfigMap, secret, volume, deployment file, etc., as used in Kubernetes.

A tenant may install the configuration objects at each cluster using a package manager. A package manager can automate the installation of configuration objects of a microservice by releasing (i.e., installing) a package in a cluster. A package is a bundle of configuration objects of a particular microservice. For example, in the cluster 102, the tenant 116 installs configuration objects 126 and 128 of microservice 122 by releasing a package 134 of the microservice 122, and in the cluster 104, the tenant 156 installs configuration objects 166 and 168 of the microservice 162 by releasing a package 174 of the microservice 162.

A tenant may also manually install configuration objects (i.e., without a package manager) of a microservice. Such configuration objects are directly installed in a cluster as a YAML configuration file (e.g., using kubectl commands) and referred to herein as "isolated configuration objects." The isolated configuration objects are not bundled in a package. In the cluster 102, the tenant 116 manually installs configuration objects 130 and 132 of the microservice 122, and in the cluster 104, the tenant 156 manually installs configuration objects 170 and 172 of the microservice 162. Hence, the clusters 102 and 104 include a combination of isolated configuration objects installed manually by tenants and non-isolated configuration objects installed from packages. Although FIG. 1 depicts a limited number of configuration objects, the clusters 102 and 104 run a multitude (e.g., thousands) of configuration objects of several microservices. Often, the relationships between configuration objects (both isolated and non-isolated configuration objects) and packages in a cluster are not visible to the tenants 116 and 156. In other words, the tenants 116 and 156 cannot determine if a configuration object in the clusters 102 and 104 was manually installed or automatically installed from a package of a microservice.

The controllers 110 and 150 map configuration objects to packages according to their metadata. The controllers 110 and 150 include respective processing resources 112 and 152 and respective machine-readable storage media 114 and 154. The machine-readable storage media 114 and 154 store instructions executable by the respective processing resources 112 and 152 to map the configuration objects and packages in respective clusters 102 and 104. Mapping refers to adding one software component, such as a configuration object into another, such as a package.

The controllers 110 and 150 discover the configuration objects deployed in the respective clusters 102 and 104 based on hardware and software resources of the respective clusters 102 and 104. For example, the clusters may include a container infrastructure management (CIM) inventory (not shown in FIG. 1) that monitors hardware resources (e.g., processing, storage, network, etc.) and identifies the various software components, such as configuration objects, packages, microservices, or the like, based on resource consumption.

The controllers 110 and 150 inspect metadata of the configuration objects and identify packages having an identical or related metadata in the respective clusters 102 and 104. For example, in the cluster 102, the controller 110 determines that configuration objects 126 and 128 include similar metadata (e.g., an identical label). After the determination, the controller 110 identifies a package, such as package 134, including the same metadata (or the label) as that of the configuration objects 126 and 128. Accordingly, the controller 110 maps the configuration objects 126 and 128 to the package 134. Similarly, in the cluster 104, the controller 150 determines that the configuration objects 166 and 168 and the package 174 include identical metadata (or label) and maps the configuration objects 166 and 168 to the package 174.

In some examples, the controllers 110 and 150 determine that some configuration objects, such as isolated configuration objects, include metadata that does not match with metadata of any of the packages in the respective clusters 102 and 104. For example, metadata of the isolated configuration object 130 may include a second label. The controller 110 may not find a package with the second label. In such examples, the controller 110 may determine that the second label and a third label correspond to (i.e., match with) a predefined label pair. After the determination, the controller 110 identifies a package including a third label and completes the mapping. For example, the controller 110 identifies that package 136 includes the third label, and maps the configuration object 130 to the package 136. Similarly, in the cluster 104, the controller 150 determines that the configuration object 170 and the package 176 include respective labels that match with a predefined label pair and maps the configuration object 170 to the package 176.

In some examples, the controllers 110 and 150 determine that some configuration objects, such as isolated configuration objects, do not include sufficient metadata. For example, metadata of the isolated configuration objects 132 and 172 may not include any labels. In such examples, the controllers 110 and 150 generate an alert for the tenants 116 and 156 indicating that some configuration objects could not be mapped due to absence of labels. The tenants 116 and 156 may provide an input (e.g., via GUI) indicating a package to which the isolated configuration objects should be mapped to. For example, the tenant 116 may indicate package 138 and the tenant 156 may indicate package 178 in their respective inputs. The controller 110 may map the configuration objects 132 to the package 138 and the controller 150 may map the configuration object 172 to the package 178.

In this manner, the controllers map each configuration object in a cluster to a package. In the cluster 102, each of the configuration objects 126, 128, 130, 132 of the microservice 122 is mapped to one of the packages 134, 136, and 138 of the microservice 122. In the cluster 104, each of the configuration objects 166, 168, 170, and 172 of the microservice 162 is mapped to one of the packages 174, 176, and 178 of the microservice 162. In some examples, the mapping process may include adding the configuration objects to a package or storing a reference (e.g., a pointer) of the configuration objects in the package.

In some examples, the controllers group the packages of a microservice into a configuration catalog for the microservice. A configuration catalog for a microservice is a collection of all packages of that microservice and includes complete configuration data (i.e., all configuration objects) of that microservice. In the cluster 102, the controller 110 determines that packages 134, 136, and 138 include configuration objects of the same microservice 122 based on metadata of the packages. For example, the packages 134, 136, and 138 include identical metadata (e.g., identical labels). The controller 110 groups the packages 134, 136, and 138 into a configuration catalog 140 for the microservice 122. In the cluster 104, the controller 150 groups the packages 174, 176, and 178 into a configuration catalog 180 for the microservice 162.

A tenant may use the configuration catalog to perform actions on the associated microservice. Actions may include modification, deletion, update, or the like, of a microservice. For example, tenant 116 may delete or modify microservice 122 by deleting or modifying the configuration objects or packages included in the configuration catalog 140 and the tenant 156 may delete or modify microservice 162 by deleting or modifying the configuration objects or packages in the configuration catalog 180.

In some examples, the controllers 110 and 150 may combine configuration catalogs of each microservice of an application into a library for the application. For example, the controller 110 may determine that configuration catalog 140 for microservice 122 and a configuration catalog 142 for microservice 124 include identical metadata (i.e., label)

because the microservices 122 and 124 form the application 144. The controller 110 may group the configuration catalogs 140 and 142 into a library (not shown in FIG. 1) for the application 144. Similarly, in cluster 104, the controller 150 may group the configuration catalogs 180 and 182 into a library for the application 184. In some examples, the microservices of an application may be on different clusters. The controllers may combine the configuration catalogs of such microservices from different clusters into a library. The controllers may maintain the libraries in one or more computing devices in the respective clusters. A library of an application stores complete configuration data of the application. A tenant may use the library to perform actions like modification, deletion, update, or the like, on the application.

In some examples, the controllers 110 and 150 may combine libraries of each application of a service into a parent library for the service. For example, the controllers 110 and 150 may determine that the respective libraries of the applications 144 and 184 include identical metadata or label because the applications 144 and 184 form the service 190. The controllers 110 and 150 may group the libraries into a parent library (not shown in FIG. 1) for the service 190. The parent library may be stored in one or more clusters. The parent library for the service 190 includes complete configuration data of the service 190. A tenant may use the parent library to perform actions like modification, deletion, update, or the like, on the service.

Figure 2:
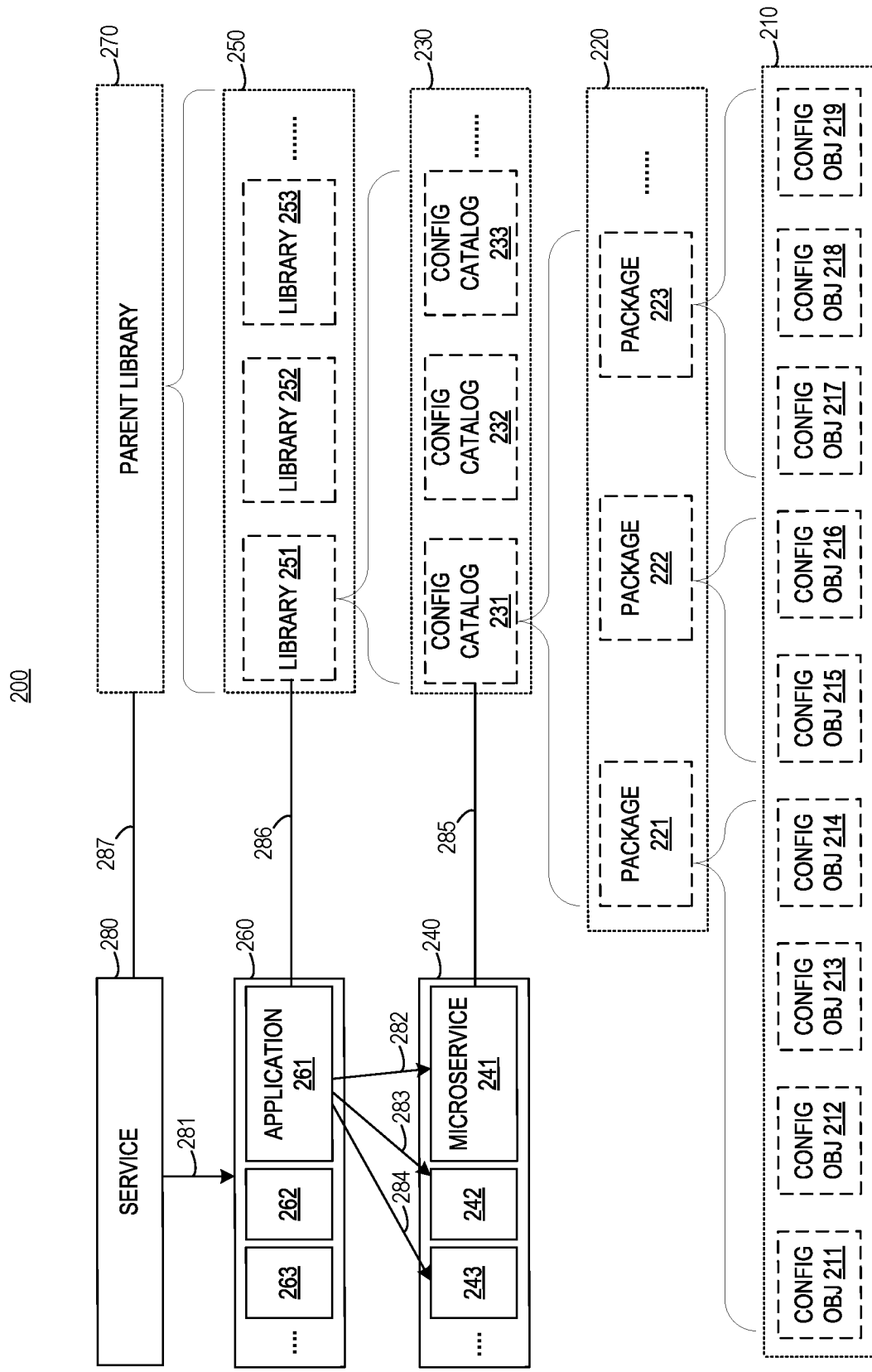
FIG. 2 is a block diagram of an example mapping between configuration objects, packages, configuration catalogs, libraries, and a parent library.

FIG. 2 is a block diagram of an example mapping 200 between configuration objects, packages, configuration catalogs, libraries, and a parent library.

The mapping 200 depicts configuration objects 210, packages 220, configuration catalogs 230 for different microservices 240, libraries 250 for different applications 260, and a parent library 270 for a service 280. The service 280 is a collection of applications 260 (indicated by line 281), which include applications 261, 262, 263, etc. For example, the service 280 may be a VPN service and the applications 261, 262, 263, etc., may be virtualized routers deployed at one or more clusters. Each application in 260 is a collection of microservices 240, which includes microservices 241, 242, 243, etc. For example, application 261 is a collection of microservices 241, 242, and 243 (indicated by lines 282, 283, and 284). The configuration data of each microservice is specified in configuration objects 210, which include configuration objects 211, 212, 213, 214, 215, 216, 217, 218, and 219 (labeled as "CONFIG OBJ").

In some examples, a controller in a cloud cluster may create sub-groups of the configuration objects according to labels indicated in the metadata of each configuration object. For example, controller may create: a first sub-group of configuration objects, which includes objects 211, 212, 213, and 214 having identical labels; a second sub-group of configuration objects, which includes objects 215 and 216 having identical labels; and a third sub-group of configuration objects, which includes objects 217, 218, and 219 having no labels.

The controller maps the sub-groups to packages based on their labels. The controller compares the label of the first sub-group and each package to identify a match. For example, the controller determines that the label of the first sub-group of configuration objects 211, 212, 213, and 214 matches with the label of the package 221. After the determination, the controller maps the first sub-group of configuration objects 211, 212, 213 and 214, to the package 221. Similarly, the controller maps the second sub-group of configuration objects 215 and 216 to the package 222, and the third sub-group of configuration objects 217, 218, and 219 to the package 223.

The controller maps the packages of each microservice into a configuration catalog for the microservice. The controller compares the labels of each package and labels of a configuration catalog for the microservice to identify a match. For example, the controller determines that the labels of the packages 221, 222, and 223 matches with the label of the configuration catalog 231. After the determination, the controller maps the packages 221, 222, and 223, to the configuration catalog 231. Each configuration catalog in 230 stores all the packages of a particular microservice in 240. For example, configuration catalog 231 stores all packages of microservice 241 (indicated by line 285). Similarly, configuration catalog 232 stores packages of microservice 242 and configuration catalog 233 stores packages of microservice 243.

The controller maps the configuration catalog for each microservice into a library for an application according to labels. For example, the controller determines that labels of configuration catalogs 231, 232, 233 matches with label of the library 251. After the determination, the controller groups the configuration catalogs 231, 232, 233 into the library 251. Each library in 250 stores the configuration catalog for each microservice of a particular application in 260. For example, library 251 stores configuration catalogs for application 261 (indicated by line 286). As depicted, the library 251, for application 261, stores all the configuration catalogs 231, 232, 233 of the microservices 241, 242, 243 of the application 261. Similarly, library 252, for application 262, stores configuration catalogs for microservices of application 262, and library 253, for application 263, stores configuration catalogs for microservices of application 263.

The controller maps the library for each application into a parent library for a service according to labels. For example, the controller determines that labels of libraries 251, 252, 253 matches with label of the parent library 270. After the determination, the controller groups the libraries 251, 252, 253 into the parent library 270 for the service 280. The parent library 270 stores the library for each application 261, 262, 263, etc., of the service 280.

Figure 3:
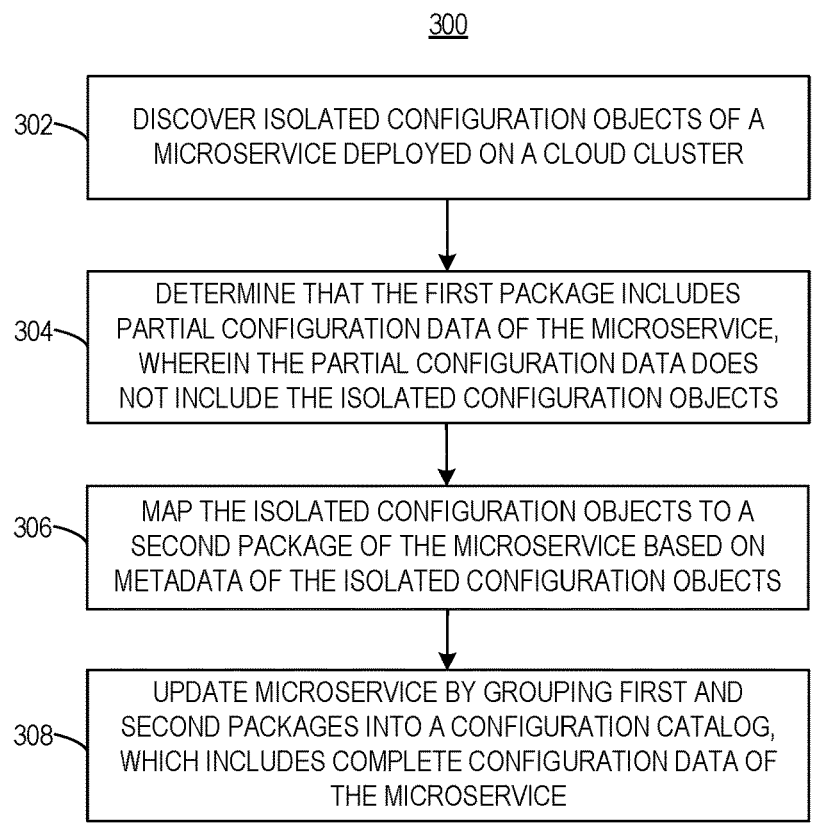
FIG. 3 is a flowchart of an example method to map configuration objects of microservices.

FIG. 3 is a flowchart depicting an example method to map configuration objects of a microservice in a cloud cluster. In some examples, method 300 may be encoded as instructions in a machine-readable storage medium and executed on a system, a computing device, or a controller stored therein, such as controller 110, 150 of FIG. 1.

At block 302, method 300 includes discovering isolated configuration objects of a microservice deployed in a cloud cluster. The isolated configuration objects are configuration files of a microservice that were manually installed (e.g., using kubectl commands) and not installed from a one or more package(s) of the microservice. In some examples, a CIM inventory of a cluster discovers isolated configuration objects based on resources (computing, storage, network, etc.) consumed in the cluster. The CIM inventory may discover isolated configuration objects periodically (e.g., in a predetermined time interval). In some examples, method 300 automatically detects whenever new configuration objects are deployed in the cluster. Alternatively, method 300 includes discovering isolated configuration objects based on user inputs. For example, a tenant may manually initiate the configuration object discovery process (e.g., via GUI).

At block 304, method 300 includes determining that the one or more package(s) include partial configuration data of the microservice. The discovery of isolated configuration objects in a cluster (as described in 302) indicates that some of the configuration objects have been manually installed in the cluster and that such configuration objects are not bundled in any package. As a result, the packages installed in the cluster include partial configuration data. The partial configuration data may include non-isolated configuration objects but does not include the isolated configuration objects. The non-isolated configuration objects refer to configuration objects that are bundled in a package of the microservice. Such objects are automatically installed in the cloud cluster by releasing the package.

At block 306, method 300 includes mapping the isolated configuration objects to a particular package of the microservice based on metadata of the isolated configuration objects. Mapping includes adding the isolated configuration objects or storing references to the isolated configuration objects in a package. In some examples, method 300 maps the isolated configuration objects to packages if the objects and packages include identical labels in their metadata. In other examples, method 300 maps the isolated configuration objects to packages if the objects and the packages include labels that correspond to a predefined label pair. In other examples, method 300 maps the isolated configuration objects to packages based on inputs from a tenant.

At block 308, method 300 includes updating the microservice by grouping the particular package of the microservice and other packages of the same microservice into a configuration catalog for that microservice. In some examples, method 300 updates the microservice periodically, automatically, or manually. For example, method 300 groups all the packages of a microservice at periodic intervals. Alternatively, method 300 groups the packages of a microservice whenever mapping of configuration objects to packages is completed. In other cases, method 300 groups the packages of a microservice based on manual inputs.

The configuration catalog for the microservice includes complete configuration data of the microservice. A tenant may use the configuration catalog to track all configuration objects and packages of a microservice. This allows the tenant to modify, update, delete, etc., the microservice and its configuration without having to manually inspect each configuration object in a cluster.

Figure 4A:
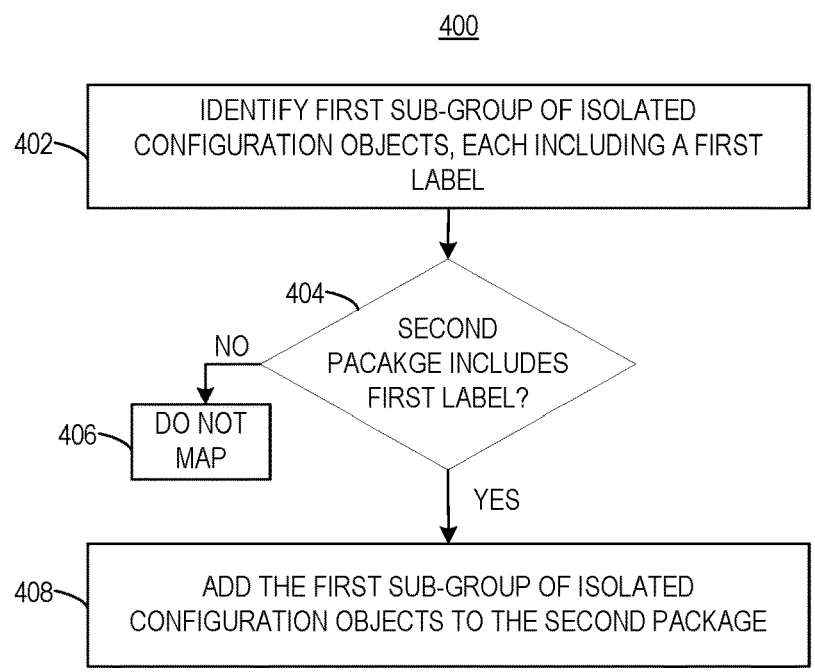
FIGS. 4A, 4B, and 4C are flowcharts of example methods to map sub-groups of configuration objects of microservices.
Figure 4B:
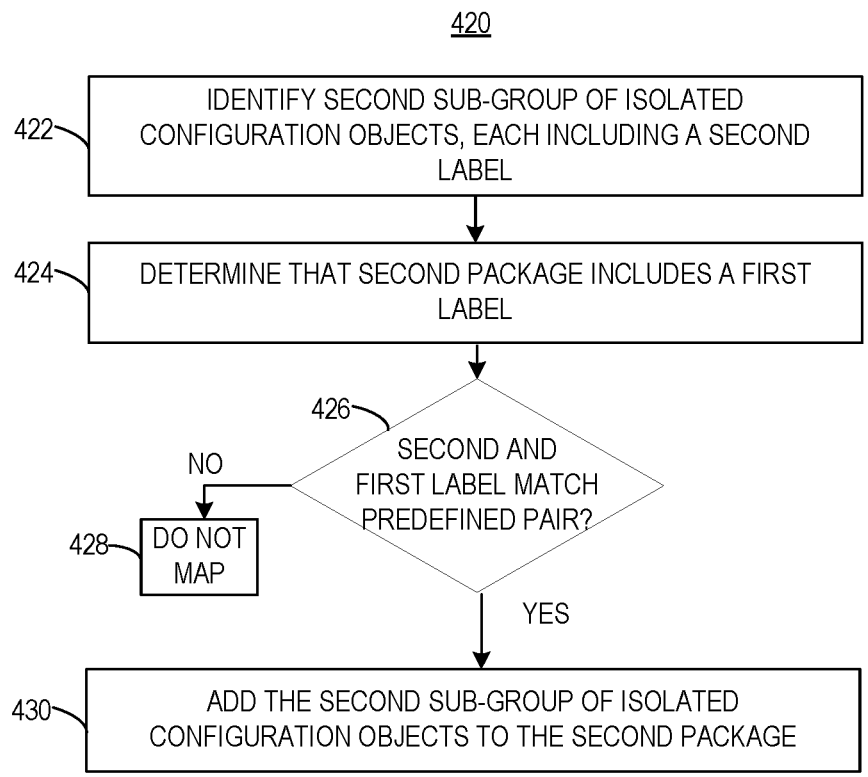
Figure 4C:
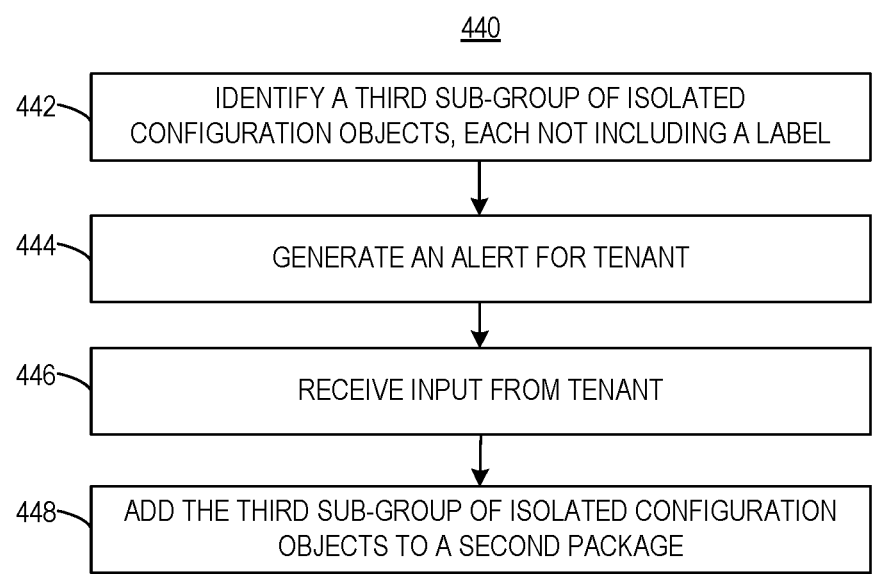

FIGS. 4A, 4B, and 4C are flowcharts of example methods to map sub-groups of isolated configuration objects of microservices.

FIG. 4A is a flowchart of an example method 400 to map a sub-group of isolated configuration objects to a particular package, if they include identical metadata.

At block 402, method 400 includes identifying a sub-group of isolated configuration objects from a plurality of configuration objects discovered in a cluster (e.g., by the CIM inventory). Each isolated configuration object in the sub-group includes a specific type of metadata. As an example, metadata of the isolated configuration objects in the sub-group (referred to herein as "first sub-group") includes a common label (referred to herein as "first label"). The first label may be included in metadata of the isolated configuration objects during creation of the isolated configuration object, for example.

At block 404, method 400 includes determining whether a package (referred to herein as "second package") of the microservice includes a label identical to the label (i.e., first label) of the identified first sub-group of isolated configuration objects. For example, method 400 may inspect metadata of each package installed in the cluster and identify a package including the first label. If metadata of the second package does not include the first label ("NO" at block 404), then method 400 proceeds to block 406.

At block 406, method 400 includes not mapping the first sub-group of isolated configuration objects to the second package. In such instances, method 400 may search for an alternative package of the microservice that has metadata including the first label.

Referring back to block 404, if the metadata of the second package includes the first label ("YES" at block 404), then method 400 proceeds to block 408.

At block 408, method 400 includes mapping the first sub-group of isolated configurations objects to the second package. The mapping includes adding the first sub-group of isolated configuration objects to the second package. In some examples, each of the first sub-group of isolated configuration objects (i.e., YAML files) are inserted in the second package, which is stored in a repository (e.g., a public repository or a private repository). In other examples, references (e.g., pointers that point to locations of each isolated configuration object) are stored in the second package.

FIG. 4B is a flowchart of an example method 420 to map another sub-group of isolated configuration objects to a particular package according to a predefined metadata pair.

At block 422, method 420 includes identifying a sub-group of isolated configuration objects (distinct from the first sub-group) from the plurality of configuration objects discovered (e.g., by the CIM inventory). Each isolated configuration object in the sub-group includes a specific type of metadata. As an example, metadata of the isolated configuration objects in the sub-group (referred to herein as "second sub-group") includes a common label (referred to herein as "second label").

At block 424, method 420 includes determining that metadata of the second package includes first label, which is distinct from the second label in the second sub-group. Due to mismatch in the respective labels, the second sub-group is not mapped to the second package unless they satisfy a specific criteria (as described in block 426).

At block 426, method 420 includes determining whether the second label and the first label correspond to a predefined label pair. The predefined label pair refers to a pair of labels defined by a tenant. As an example, method 420 determines if the pair of second label (of the second sub-group) and the first label (of the second package) matches with a label pair defined by the tenant. If the first and second labels do not match with a predefined label pair (labeled as "NO" at block 426), then method 420 proceeds to block 428. At block 428, method 420 does not map the second sub-group to the second package.

Referring back to block 426, if the first label and the second label match with a predefined label pair (labeled as "YES" at block 426), then method 420 proceeds to block 430.

At block 430, method 420 includes mapping the second sub-group of isolated configurations objects to the second package. The mapping includes adding the second sub-group of isolated configuration objects to the second package.

FIG. 4C is a flowchart of an example method 440 to map a sub-group of isolated configuration objects that do not include sufficient metadata to complete the mapping process.

At block 442, method 440 includes identifying a third sub-group of isolated configuration objects (distinct from the first and second sub-groups) from the plurality of isolated configuration objects discovered in the cluster. Each isolated configuration object in the third sub-group does not include sufficient metadata for mapping process. As an example, the isolated configuration objects in the third sub-group do not include any label.

At block 444, method 440 includes generating an alert for a tenant. The alert indicates that the third sub-group of isolated configuration objects do not include any label. For example, the alert may be a notification displayed on a graphical user interface of a device operated by the tenant.

At block 446, method 440 includes receiving an input from the tenant for mapping the isolated configuration objects of the third sub-group to one or more package(s). In some examples, the input indicates that the third sub-group of isolated configuration objects is to be mapped to the second package of the microservice. In other examples, the input includes a label, such as a first label, that is to be included in the metadata of the isolated configuration objects of the third sub-group. Method 440 identifies a package of the microservice that includes the first label and proceeds to map the third sub-group to that package.

In some examples, the tenant creates a third package (distinct from the first and second package). The third package may be intended to bundle isolated configuration objects of the third sub-group. Additionally, isolated configuration objects discovered after the creation of the third sub-group may also be mapped to the third package. The third package may include isolated configuration objects of a single microservice or those of multiple microservices of the same or different applications.

At block 448, method 440 includes mapping the third sub-group of isolated configuration objects to the second package as indicated in the input provided by the tenant. In the example where the input indicates the second package, method 440 adds the third sub-group of isolated configuration objects to the second package. Similarly, in the example where the input indicates the first label, method 440 identifies that the second package includes the first label and maps the third sub-group to the second package. In other examples, the third sub-group of isolated configuration objects are added to the newly created third package.

Figure 5:
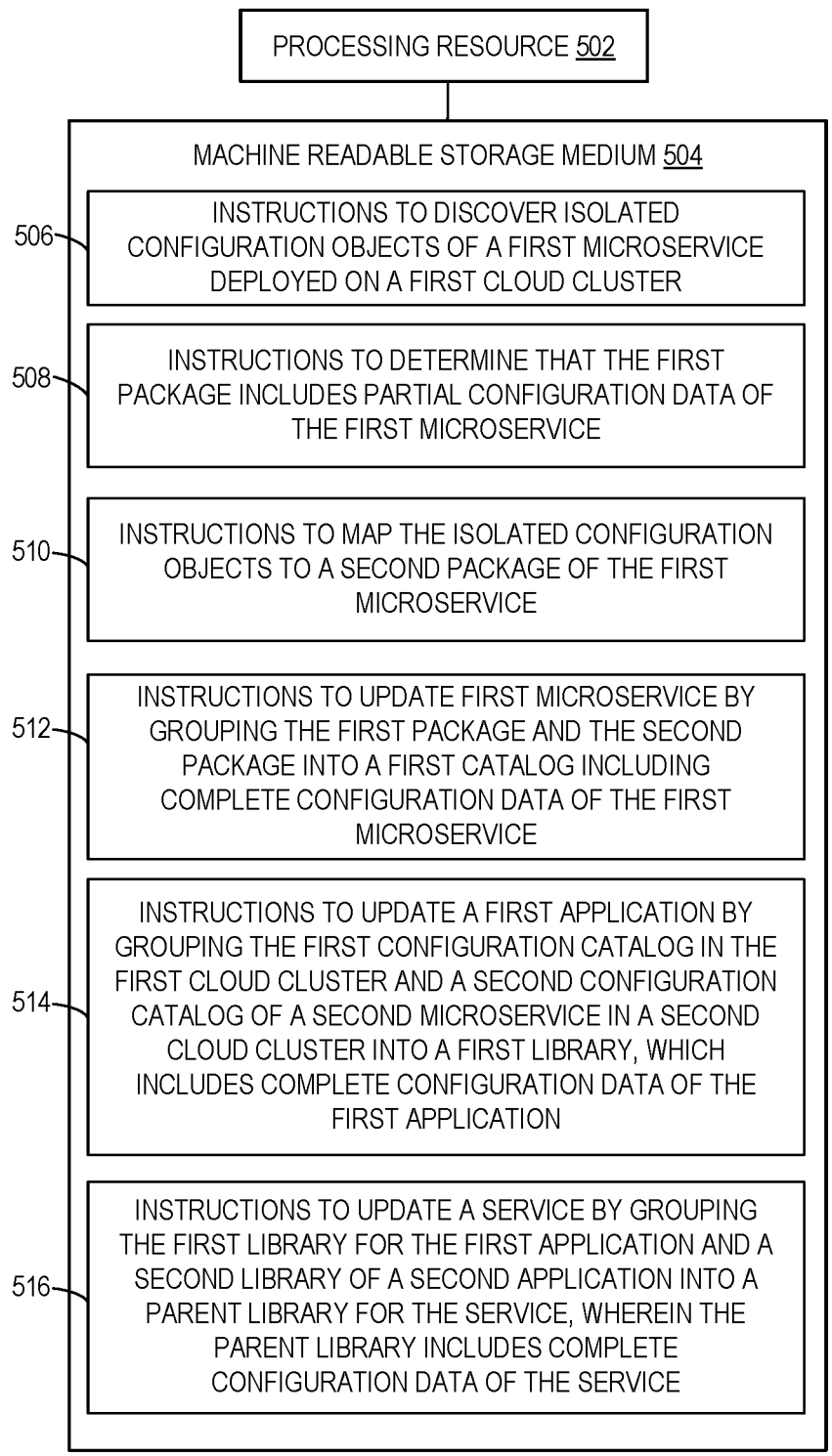
FIG. 5 is a block diagram depicting a processing resource and a machine-readable medium encoded with example instructions to map configuration data of microservices, applications, and services.

FIG. 5 is a block diagram depicting a processing resource 502 and a machine-readable medium 504 encoded with example instructions to map configuration objects of microservices deployed in a cloud cluster.

The instructions 506, when executed, cause the processing resource 502 to discover isolated configuration objects of a first microservice deployed in a first cloud cluster. The isolated configuration objects are manually installed in the first cloud cluster and not installed from a first package of the first microservice.

The instructions 508, when executed, cause the processing resource to determine that the first package includes partial configuration data of the first microservice, such that the partial configuration data does not include the isolated configuration objects. The partial configuration data includes some of the non-isolated configuration objects of the microservice.

The instructions 510, when executed, cause the processing resource 502 to map the isolated configuration objects to a second package of the first microservice based on metadata of the isolated configuration objects. For example, the mapping may be based on comparison of labels specified in the metadata of the isolated configuration objects and the second package.

The instructions 512, when executed, cause the processing resource 502 to update the first microservice by grouping the first package and the second package into a first configuration catalog for the first microservice. The updated first configuration catalog includes complete configuration data of the first microservice.

The instructions 514, when executed, cause the processing resource 502 to update a first application by grouping configuration catalogs of each microservice of the first application. For example, if the first application includes a first and second microservice, then updating the first application includes grouping the first configuration catalog for the first microservice in the first cloud cluster and a second configuration catalog for a second microservice in a second cloud cluster into a first library for the first application. The first library includes complete configuration data of the first application.

The instructions 516, when executed, cause the processing resource 502 to update a service by grouping libraries of each application forming the service. For example, if the service includes the first application and second application, then updating the service includes grouping the first library for the first application and a second library for a second application into a parent library for the service. The parent library includes a complete configuration data of the service.

As used herein, a "microservice" refers to a small executable unit, such as a container, that performs a specific function of an application. A microservice includes a container image (program logic) and configuration data (configuration objects). An "application" is a collection of microservices, each of which performs a function and communicates with other microservices of the same or other applications via application programming interface (API) calls. A "service" refers to a collection of applications performing multiple functions.

Configuration object refers to a file (e.g., YAML file) that specifies configuration data of a microservice. Isolated configuration object refers to a configuration object that is not bundled in a package. Isolated configuration object is deployed in a cluster by manual installation (e.g., using kubectl commands) and not by installing a package.

Metadata refers to data describing a configuration object, a package, a configuration catalog, a library, or a parent library. Label is a type of metadata of configuration objects or packages. Labels are used for identifying and organizing the configuration objects, packages, etc. Often, labels are specified during object or package creation, but they can be added and modified at any time (e.g., by a tenant).

Configuration catalog is a collection of packages of a microservice. The configuration catalog specifies comprehensive configuration data of the microservice. Library refers to a collection of configuration catalogs of the microservices of an application. The library includes complete configuration data an application. Parent library refers to a collection of libraries of applications forming a service. The parent library includes comprehensive configuration data of a service.

Discover refers to searching, identifying, and monitoring configuration objects based on resources consumed at a datacenter.

Mapping refers to adding one Kubernetes component, such as configuration objects, packages, configuration catalogs, or libraries, into another based on comparison of their metadata.

Cloud cluster or cluster refers to a datacenter or a group of servers that implement a microservice orchestration system (e.g., Kubernetes). The clusters may be located in different or same geographical locations.

"Manually install" refers to installing a configuration object directly to a cloud cluster (e.g., using kubectl commands) and not via a package manager, such as Helm.

In the examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In the examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, a hyperconverged device, a storage device, a storage component, a desktop or laptop computer, or any other processing device or equipment including a processing resource. In certain examples, the computing device may be or may include a virtualized computing device (e.g., a virtual machine or a containerized application) executing on hardware. In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In the examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIG. 1, storage media 114 and 154 may be implemented by one machine-readable storage medium, or multiple machine-readable storage media. Moreover, in certain examples, where the computing device may be a virtual machine or a containerized application, the processing resource and the machine-readable storage medium may represent a processing resource and a machine-readable storage medium of the hardware or a computing system that hosts the computing device as the virtual machine or the containerized application.

Although the present disclosure has been described in detail, it should be understood that various changes, substitutions, and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

What is claimed is:

1. A method comprising:
   discovering, by a system comprising a hardware processor, isolated configuration objects of a microservice deployed in a cloud cluster, the isolated configuration objects manually installed in the cloud cluster and not installed as part of any package of the microservice;
   determining, by the system, that a first package of the microservice includes partial configuration data of the microservice, wherein the partial configuration data includes non-isolated configuration objects of the microservice and does not include the isolated configuration objects;
   mapping, by the system, the isolated configuration objects to a second package of the microservice based on comparing metadata of the isolated configuration objects to metadata of the second package, wherein the mapping comprises:
      identifying a sub-group of the isolated configuration objects, wherein metadata of the sub-group includes a second label,
      determining that the metadata of the second package includes a first label, and
      based on determining that the second label and the first label correspond to a predefined metadata pair, adding the sub-group of the isolated configuration objects to the second package;
   updating, by the system, the microservice by grouping the first package of configuration objects and the second package of configuration objects into a configuration catalog for the microservice, wherein the configuration catalog includes complete configuration data of the microservice, and the complete configuration data includes the non-isolated configuration objects and the isolated configuration objects;
   managing, by the system, the microservice using configuration data in configuration objects in the configuration catalog, including assigning a network address or storing a credential relating to the microservice; and
   performing, in the system, a management action relating to the microservice based on the complete configuration data in the configuration catalog.

2. The method of claim 1, wherein the discovering of the isolated configuration objects in the cloud cluster comprises:
   accessing, by the system, a microservice infrastructure management (MIM) inventory, wherein the MIM inventory identifies the isolated configuration objects in the cloud cluster based on consumption of computing resources.

3. The method of claim 1, wherein the mapping of the isolated configuration objects to the second package of the microservice comprises:

identifying, by the system, a further sub-group of the isolated configuration objects, wherein metadata of the further sub-group includes the first label, determining, by the system, that the metadata of the second package includes the first label, and adding, by the system, the further sub-group to the second package.

4. The method of claim 1, further comprising:

identifying, by the system, a further sub-group of the isolated configuration objects, wherein metadata of the further sub-group of the isolated configuration objects does not include a label; and generating, for a tenant, an alert indicating that the further sub-group of the isolated configuration objects does not include the label.

5. The method of claim 4, further comprising:

receiving, from the tenant, an input indicating that the further sub-group of the isolated configuration objects is to be mapped to the second package;

mapping, by the system, the further sub-group of the isolated configuration objects to the second package; and inserting, by the system, the first label of the second package as the metadata of the further sub-group of the isolated configuration objects.

6. The method of claim 4, further comprising:

creating, by the system, a third package;

mapping, by the system, the further sub-group of the isolated configuration objects to the third package; and updating, by the system, the microservice by grouping the first package, the second package, and the third package into the configuration catalog for the microservice.

7. The method of claim 1, further comprising:

updating, by the system, an application by grouping the configuration catalog for the microservice in the cloud cluster and one or more configuration catalogs of microservices in an external cloud cluster into a library for the application, wherein the library includes complete configuration data of the application.

8. The method of claim 7, further comprising:

updating, by the system, a service by grouping the library for the application and one or more libraries of applications into a parent library for the service, wherein the parent library includes complete configuration data of the service.

9. The method of claim 8, further comprising:

presenting, by the system, one or more of the configuration catalog for the microservice, the library for the application, or the parent library for the service to a tenant; and receiving, by the system, a request to perform an action on one or more of the microservice, the application, or the service, from the tenant, wherein the action includes modification or deletion.

10. A system comprising:

a hardware processor; and a non-transitory machine-readable storage medium comprising instructions executable on the hardware processor to:

discover isolated configuration objects of a first microservice deployed in a first cloud cluster, the isolated configuration objects not installed as part of any package of the first microservice;

determine that a first package of the first microservice includes partial configuration data of the first microservice, wherein the partial configuration data includes non-isolated configuration objects of the microservice and does not include the isolated configuration objects;

map the isolated configuration objects to a second package of the first microservice based on comparing metadata of the isolated configuration objects to metadata of the second package, wherein the mapping comprises:

identifying a sub-group of the isolated configuration objects, wherein metadata of the sub-group includes a second label, determining that the metadata of the second package includes a first label, and based on determining that the second label and the first label correspond to a predefined metadata pair, adding the sub-group of the isolated configuration objects to the second package;

update the first microservice by grouping the first package of configuration objects and the second package of configuration objects into a first configuration catalog for the first microservice, wherein the first configuration catalog includes complete configuration data of the first microservice, and the complete configuration data includes the non-isolated configuration objects and the isolated configuration objects;

update an application by grouping the first configuration catalog for the first microservice in the first cloud cluster and a second configuration catalog for a second microservice in a second cloud cluster into a library for the application, wherein the library includes complete configuration data of the application;

manage the first microservice using configuration data in configuration objects in the first configuration catalog, including assigning a network address or storing a credential relating to the first microservice; and perform, in the system, a management action relating to the first microservice based on the complete configuration data in the first configuration catalog.

11. The system of claim 10, wherein the instructions to map the isolated configuration objects to the second package of the first microservice comprises instructions to:

identify a further sub-group of the isolated configuration objects, wherein metadata of the further sub-group includes the first label;

determine that the metadata of the second package includes the first label; and add the further sub-group to the second package.

12. The system of claim 10, wherein the instructions are executable on the hardware processor to:

identify a further sub-group of the isolated configuration objects, wherein metadata of the further sub-group of the isolated configuration objects does not include a label; and generate, for a tenant, an alert indicating that the further sub-group of the isolated configuration objects does not include the label.

13. The system of claim 12, wherein the instructions are executable on the hardware processor to:

receive, from the tenant, an input including a third label; and insert the third label as the metadata of the further sub-group of the isolated configuration objects.

14. The system of claim 13, wherein the instructions are executable on the hardware processor to:

identify a third package including metadata including the third label;

map the further-sub-group of the isolated configuration objects to the third package; and update the first microservice by grouping the first package, the second package, and the third package into the first configuration catalog for the first microservice.

15. The system of claim 10, wherein the instructions are executable on the hardware processor to:

update a service by grouping the library for the application and one or more libraries of applications into a parent library for the service, wherein the parent library includes complete configuration data of the service.

16. A non-transitory machine-readable storage medium comprising instructions that when executed cause a system to:

discover isolated configuration objects of a first microservice deployed in a first cloud cluster, the isolated configuration objects not installed as part of any package of the first microservice;

determine that a first package of the first microservice includes partial configuration data of the first microservice, wherein the partial configuration data includes non-isolated configuration objects of the microservice and does not include the isolated configuration objects;

map the isolated configuration objects to a second package of the first microservice based on compared metadata of the isolated configuration objects to metadata of the second package, wherein the mapping comprises:

identifying a sub-group of the isolated configuration objects, wherein metadata of the sub-group includes a second label, determining that the metadata of the second package includes a first label, and based on determining that the second label and the first label correspond to a predefined metadata pair, adding the sub-group of the isolated configuration objects to the second package;

update the first microservice by grouping the first package of configuration objects and the second package of configuration objects into a first configuration catalog for the first microservice, wherein the first configuration catalog includes complete configuration data of the first microservice, and the complete configuration data includes the non-isolated configuration objects and the isolated configuration objects;

update a first application by grouping the first configuration catalog for the first microservice in the first cloud cluster and a second configuration catalog for a second microservice in a second cloud cluster into a first library for the first application, wherein the first library includes complete configuration data of the first application;

update a service by grouping the first library for the first application and a second library for a second application into a parent library for the service, wherein the parent library includes complete configuration data of the service;

manage the first microservice using configuration data in configuration objects in the first configuration catalog, including assigning a network address or storing a credential relating to the first microservice; and perform, in the system, a management action relating to the first microservice based on the complete configuration data in the first configuration catalog.

17. The non-transitory machine-readable storage medium of claim 16, further comprising instructions to:

present one or more of the first configuration catalog for the first microservice, the second configuration catalog for the second microservice, the first library for the first application, the second library for the second application, or the parent library for the service, to a tenant; and receive a request to perform an action on one or more of the first microservice, the second microservice, the first application, the second application, or the service, from the tenant, wherein the action includes modification or deletion.

* * * * *